United States Patent [19]
Heurtley

[11] 3,949,160
[45] Apr. 6, 1976

[54] ELECTRO-OPTIC READOUT OF THERMOPLASTIC DEFORMATION PATTERNS

[75] Inventor: John C. Heurtley, Arlington, Va.

[73] Assignee: Xerox Corporation, Stamford, Conn.

[22] Filed: Jan. 6, 1975

[21] Appl. No.: 538,534

[52] U.S. Cl. ............... 178/6.6 TP; 96/1.1; 178/7.2; 340/173 TP; 350/162 R
[51] Int. Cl.² . H04N 5/82; H04N 5/30; G03G 16/00
[58] Field of Search ..................... 178/6.6 TP, 7.2; 340/173 TP, 173 CR, 173 LM; 346/74 TP, 77 R, 77 F, 3.5; 350/162 R, 162 SF; 179/100.3 G; 96/1.1

[56] References Cited
UNITED STATES PATENTS

| | | | |
|---|---|---|---|
| 3,131,257 | 4/1964 | Wallace | 178/7.2 |
| 3,436,216 | 4/1969 | Urbach | 96/1.1 |
| 3,838,401 | 9/1974 | Graf et al. | 340/173 TP |

*Primary Examiner*—Raymond F. Cardillo, Jr.
*Attorney, Agent, or Firm*—James J. Ralabate; Michael H. Shanahan; John B. Mitchell

[57] ABSTRACT

A method of and apparatus for reading out information disposed as a surface deformation such as a thermoplastic deformation pattern is disclosed in accordance with the teachings of the present invention. A coherent light beam is projected to the surface deformation pattern and one of the first order components of the diffraction pattern received from the deformation pattern is imaged onto a surface. At the surface, the first order component is mixed with a further coherent light beam to form an interference pattern comprised of image modulated sinusoidal interference fringes. The interference pattern has an intensity that varies as a linear function of the amplitude of the deformation pattern. In a preferred embodiment thereof, the first order component of the diffraction pattern is imaged to the surface by an imaging lens optically positioned out of optical communication with the zero order component of the diffraction pattern. The further coherent light beam is provided by optical filter disposed to receive the zero order component of the diffraction pattern and to transmit the zero order component to the surface. The optical filter includes a lens having a focal point disposed in the focal plane of the imaging lens and offset from the focal point of the imaging lens. The surface at which the interference pattern is formed comprises a photoelectric transducer for generating an electric signal representing the interference pattern, the signal being comprised of an informational component related to the deformation pattern modulated onto a carrier component related to the spatial frequency of the interference fringes. The informational component is recovered by demodulation of the electric signal.

26 Claims, 4 Drawing Figures

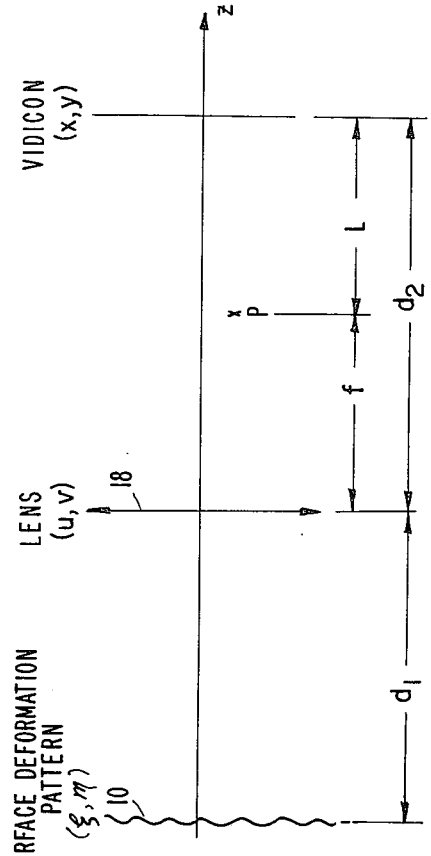
FIG. 2
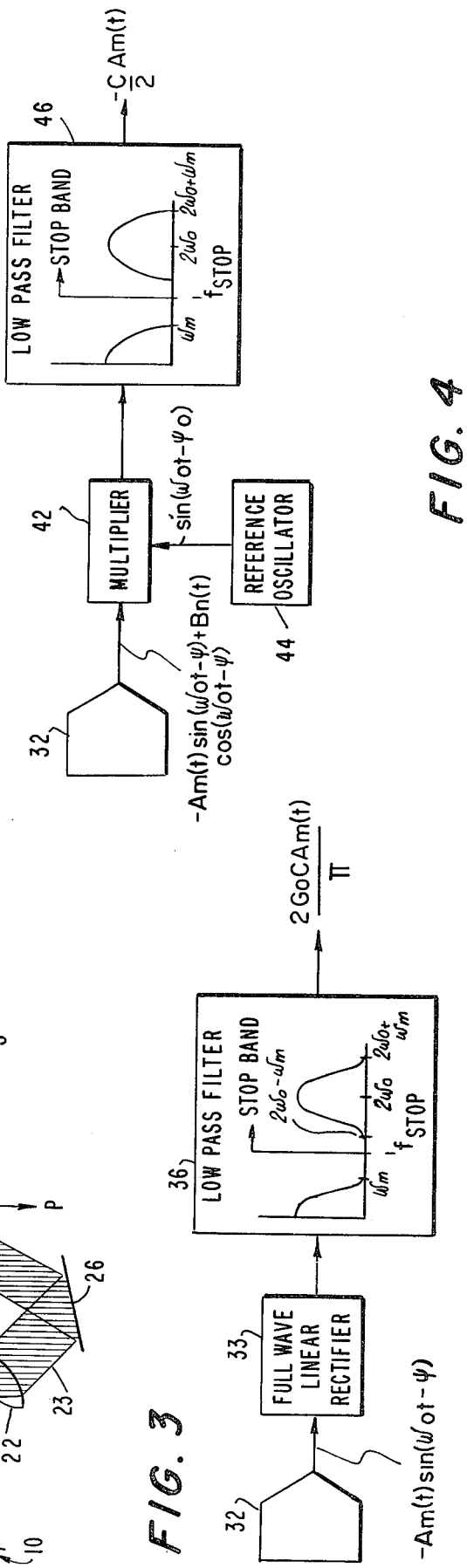
FIG. 4
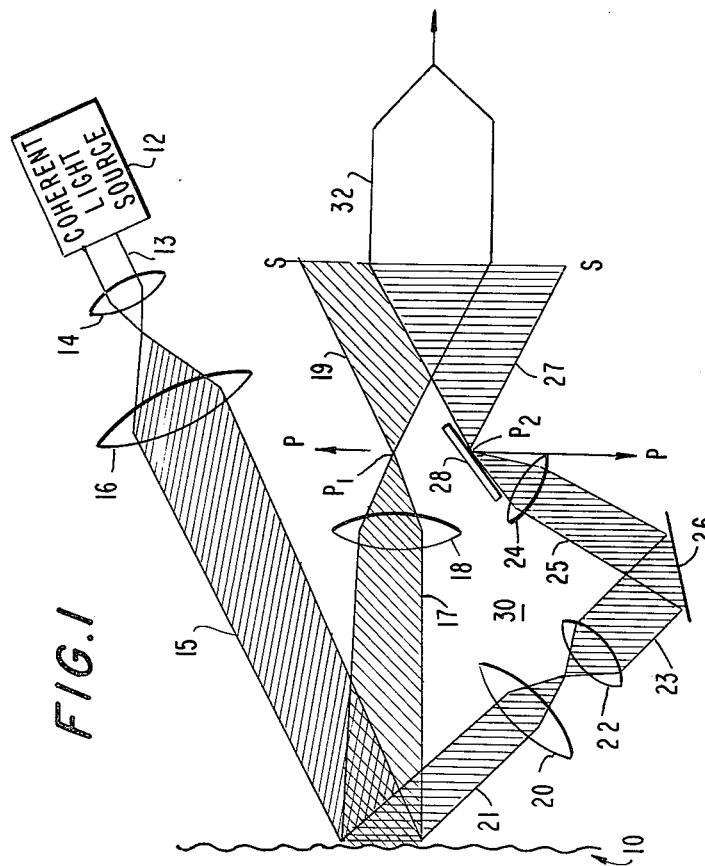
FIG. 1
FIG. 3

ELECTRO-OPTIC READOUT OF
THERMOPLASTIC DEFORMATION PATTERNS

This invention relates to the reading out of periodic surface deformation patterns such as thermoplastic deformation patterns and, in particular, to a method of and apparatus for increasing the intensity of the light image read out from said deformation patterns to accurately transmit an electrical representation of the information disposed thereon.

The introduction of surface deformation information recording techniques such as thermoplastic recording techniques has expanded the capabilities and versatilities heretofore known in image recording technology. The instant invention is directed to methods and apparatus for enhanced recovery of information stored as surface deformation patterns and although fully applicable to the recovery of any information stored as a periodic surface deformation pattern will be disclosed in association with information recorded as thermoplastic deformation patterns as the same are best known to those of ordinary skill in the art. Thermoplastic recording techniques have generally been categorized as relief deformation imaging and frost deformation imaging. The production of a relief image is obtained by selectively charging a layer of thermoplastic material by a cathode ray tube and thereafter applying heat or solvents thereto such that the thermoplastic layer deforms in response to the charges deposited thereon. An alternative recording technique employs conventional electrophotographic processes to deposit an electrostatic charge on a thermoplastic layer overcoating a photoconductive layer and thereafter selectively dissipating said electrostatic charge in accordance with a light and dark pattern of a light image projected thereto. The resulting electrostatic latent image may then cause corresponding relief deformation patterns in response to the application of heat or solvents to the thermoplastic layer. Such relief deformation pattern is characterized by ridges that occur at areas of substantial differences in charge density. As ridges are formed only at the boundaries between adjacent charge differential areas, relief deformation is not adaptable for continuous tone reproduction of images. Furthermore, the image information recorded by relief deformation techniques are not readily viewable in the absence of specialized projectors such as the well-known Schlieren projector.

The recording of a light image on a thermoplastic medium by frost imaging techniques results in a deformation pattern that is markedly distinct from a relief pattern. Frost deformation is characterized by surface folds or wrinkles obtained on the surface of the thermoplastic layer which, to an observer, appears similar to a frosted piece of glass. A frost image, in addition to the suitable recording of high contrast line copy, exhibits continuous tone response capable of solid area reproduction and may be viewed directly or displayed by a simplified optical reflection or transmission system. In frost imaging, the deformation of the thermoplastic layer is responsive to the absolute charge densities thereon. Reference is made to the article entitled "A Cyclic Xerographic Method Based on Frost Deformation" by R. W. Gundlach and C. J. Claus, *Photographic Science and Engineering*, Vol. 7, No. 1, pp. 14 – 19, 1963, for further description of the mechanics of frost deformation, exemplary frost imaging systems and a discussion of typical optical readout systems usable therewith.

It has been found that, in many applications, the frost deformation pattern formed in a thermoplastic layer is a distorted representation of the original input information. This has been generally attributed to the occurrence of an overlap between the spatial spectrum of the incident light image and the resonance points of the thermoplastic layer. To prevent such image distortion, it has been proposed to provide a photoreceptor structure having a periodic physical profile established at the interface between the photoconductive layer and the thermoplastic layer. If the spatial frequency of the periodic physical profile approaches the quasi-resonant frequency of the thermoplastic layer, distortion of the frost pattern is substantially eliminated and the surface of the thermoplastic layer will frost in a periodic or organized manner. A further description of such periodic frost deformation is provided in U.S. Pat. No. 3,698,893 which issued to John C. Heurtley and is assigned to Xerox Corporation, the assignee of the instant invention. Additional disclosure of periodic thermoplastic deformation imaging is provided in U.S. Pat. No. 3,719,483 which issued to Lloyd F. Bean. A further alternative to the production of periodic frost deformation patterns contemplates the application of a periodically varying electric field component during the developing process, as described in U.S. Patent application Ser. No. 27,310.

A still further solution to the problem of distorted information disposed as a frost deformation pattern is suggested in U.S. Pat. No. 3,436,216 to J. C. Urbach. As disclosed therein, image information is modulated prior to exposure of the thermoplastic photoreceptor thereto by transmitting said image information through a spatial grating such as a screen or grid having a sinusoidal transmission characteristic whose frequency corresponds to the quasi-resonance frequency of the thermoplastic layer. As further suggested in the Urbach patent, the periodic frost deformation pattern may be optically read out by transmitting a beam of coherent light through the frost pattern and then spatial filtering the modulated image signal to reproduce the original image on a display screen. The source of coherent light may be a laser placed at an off-axis angle from a condenser lens and a projection lens. By displacing the laser source at an off-axis angle only the first order diffraction spectra produced from the periodic frost deformation image are projected to form the demodulated image on the display screen. The imaging system thus described in the Urbach patent to recover image information from a periodic frost pattern by projecting only the first order diffraction spectra and by specifically obstructing the projection of the zero order diffraction spectra is exemplary of the so-called Suzuki demodulation technique. Such technique is described in the article entitled "Image of the Optical Grating Modulated by the Signal and Its Application to the Measurement of Strain Distribution" by T. Suzuki et al., *Journal of Applied Optics*, Vol. 3, No. 7, pp. 825–831, 1964.

Although the Suzuki demodulation technique finds ready application to recover original image information from virtually any regular periodic surface deformation pattern such as a thermoplastic deformation pattern, an attendant disadvantage thereto is the relatively low intensity of the recovered image when the magnitude of the surface purtubations are small as is the case with frost images obtained from screened frost recording techniques and the like. More particularly, the intensity of the "Suzuki" image is non-linearly related to the amplitude of the periodic deformation pattern. It has been determined that the intensity of the Suzuki image is dependent upon the square of the amplitude of the frost pattern. Consequently for amplitude excursions which are smaller than one, as is clearly the case in frost deformation recording the Suzuki image intensity range becomes quite small. Such intensity range and resultant low illuminance of the Suzuki image requires very high resolution to accurately perceive the full detail included in the original image. Moreover, should it be desired to convert the recovered image to an electrical representation thereof by using a conventional photoelectrical transducer, such as a vidicon tube, such conversion is frequently accomplished with a loss of integrity resulting in a loss of information due to an inability to operate within the linear range or preferred operating range of the transducer. Hence, the electrical representation of the recovered image is not truly representative of the original light image. High resolution vidicons are known to be responsive to relatively high intensity target illumination having a dynamic contrast range of 20:1. The use of such vidicons is, therefore, not readily available when a Suzuki image is relied upon for image recovery. It is, therefore, necessary to increase the light intensity of a recovered image and to achieve a linear relationship between the recovered image intensity and the amplitude of the periodic deformation pattern for those practical applications employing optical readout of a periodic thermoplastic frost pattern.

OBJECTS OF THE INVENTION

Therefore, it is an object of the present invention to provide a method of and apparatus for reading out a regular periodic surface deformation pattern.

It is another object of the present invention to provide a method of and apparatus for electrically transmitting information contained in a regular periodic surface deformation pattern to a remote location.

A further object of the present invention is to provide a method of and apparatus for increasing the intensity of a display image of a periodic surface deformation pattern such as a screened thermoplastic frost pattern.

Yet another object of the instant invention is to provide a method of and apparatus for displaying an image disposed as a regular periodic surface deformation pattern.

A still further object of the present invention is to provide a method of and apparatus for projecting a light image of a regular periodic surface deformation pattern such as a periodic thermoplastic frost deformation pattern, said light image having an intensity that varies as a linear function of the amplitude of the purtubations of said surface deformation pattern.

Yet another object of the present invention is to provide a method and apparatus for linearizing the intensity range of a light image read out from a periodic surface deformation pattern.

Another object of the present invention is to provide a method of and apparatus for deriving an electrical signal that is linearly related to an informational component disposed as a regular periodic surface deformation pattern.

It is another object of the present invention to provide a method of and apparatus for forming image modulated sinusoidal interference fringes wherein said image modulations are linearly related to information recorded as a regular periodic surface deformation pattern.

A still further object of the instant invention is to provide a method of and apparatus for improving the intensity range of a Suzuki image by mixing a beam of coherent light with said Suzuki image.

Various other objects and advantages of the present invention will become clear from the following detailed description of an exemplary embodiment thereof, and the novel features will be particularly pointed out in connection with the appended claims.

SUMMARY OF THE INVENTION

In accordance with the present invention, a method of and apparatus for transmitting an image disposed as a regular periodic surface deformation pattern such as a thermoplastic deformation pattern is provided wherein a beam of coherent light is projected to the deformation pattern; one of the first order components of the diffraction pattern received from the deformation pattern is imaged onto the surface of a photoelectric transducer; the zero order component of the diffraction pattern received from the deformation pattern is derived and transmitted to said photoelectric transducer surface whereat the zero order component mixes with said first order component to form an interference pattern comprised of image modulated sinusoidal interference fringes thereby generating an electrical representation of said interference pattern comprised of an electrical informational component related to the surface deformation pattern modulated onto an electrical carrier component related to the interference frequency; the electrical information component is demodulated from the electrical representation whereby the recovered information may be transmitted to a remote location.

BRIEF DESCRIPTION OF THE DRAWINGS

The invention will be more clearly understood by reference to the following detailed description of an exemplary embodiment thereof in conjunction with the accompanying drawings in which:

FIG. 1 is a schematic representation of apparatus that may be employed to carry out the electro-optic readout of a frost deformation image in accordance with the present invention;

FIG. 2 is a simplified model of the spatial relationship among pertinent elements in a portion of the transmission path in an electro-optic readout system which is useful for analytical purposes;

FIG. 3 is a block diagram depicting the demodulation of an electrical representation of an image modulated interference pattern produced by the apparatus of FIG. 1; and FIG. 4 depicts an alternative embodiment of a demodulation technique that may be employed to recover original image information.

DETAILED DESCRIPTION OF THE INVENTION

Optical Readout of a Surface Deformation Pattern Such As A Thermoplastic Deformation Pattern Referring now to the drawings and, in particular, to FIG. 1, there is illustrated a schematic representation of apparatus adapted to carry out the novel method of the present invention. The depicted apparatus serves to read out the regular periodic surface deformation pattern disposed, in this case, on the thermoplastic material such that a light image of the previously recorded information is displayed at a surface. The readout apparatus is comprised of a source of coherent light 12, collimating lens means 14, 16, imaging lens means 18, optical filter means 30 and image receiving surface S—S. The source of coherent light 12 is adapted to project a beam of quasi-monochromatic coherent light and, therefore, may comprise a conventional pulsed or non pulsed laser light source such as an ion pulsed laser system, a neodymium-doped laser system, or the like. A typical ion pulsed laser system that may be readily employed is the conventional ion argon laser. A suitable conventional neodymium-doped laser is the yttrium-aluminum garnet (YAG) laser. Of course, the foregoing examples are merely illustrative and one of ordinary skill in the art will readily appreciate that any conventional laser source adapted to produce a beam of coherent light may be readily employed with the instant invention.

Collimating lens means 14, 16 is adapted to receive the beam of coherent light generated by the source 12 and to expand said beam to a cross-sectional dimension that may be advantageously employed to read out the information disposed as a regular periodic thermoplastic deformation pattern. Preferably, collimating lens means 14, 16 includes individual optical lenses to enlarge the beam diameter and to additionally establish convergence of the expanded beam. Lens 14 may normally be the objective of a microscope and, additionally, the resultant light beam may admit of a plane wave front defined by substantially parallel rays of light as opposed to the illustrated convergent light beam. Convergence of the expanded beam is here preferred to permit the entire spatial frequency spectrum of the image transmitted from the regular periodic thermoplastic deformation pattern to pass through imaging lens means 18 with low aberration, adequate resolution and good transmission, and to reduce the numerical aperture of the imaging lens means. Thus, convergence of the expanded light beam permits the use of commercially available optical lenses for imaging lens means 18 without resorting to expensive modifications thereof. Additionally, the lens aperture may admit of a practical dimension thus facilitating the use of an optical lens of reasonable size. As is now appreciated, the convergence of the expanded beam allows the use of commercially available lenses having favorable optical properties. One of ordinary skill in the optics art would, therefore, recognize that collimating lens means 14, 16 may comprise a conventional Tropel beam expander.

Imaging lens means 18 is here positioned in reflective optical communication with the regular periodic thermoplastic deformation pattern disposed in thermoplastic material 10. Although the transmission of light to imaging lens means 18 by reflection is here illustrated, it should be readily apparent that direct transmission of light through the thermoplastic material to the imaging lens means is contemplated. Consequently, the illustrated embodiment is merely exemplary; and the following description is equally applicable to a light reflection or transmission system. As is recognized by those of ordinary skill in the optics art, a regular periodic thermoplastic deformation pattern, such as a frost deformation pattern, acts upon incident light in a manner analogous to a conventional diffraction grating. That is, in the reflection mode illustrated herein, light incident on a diffraction grating results in the reflection therefrom of a specular component that is the image of the light source and, additionally, the reflection therefrom of diffraction spectra including various order components. In the reflection mode, the specular component corresponds to the zero order diffraction component with an angle of reflection equal to the angle of incidence. However, the diffraction spectra components are reflected from the surface of the diffraction grating at angles that are not equal to the angle of incidence. Similarly, in a light transmission mode, the zero order diffraction component is transmitted through the diffraction grating along an optical path identical with that traversed by the incident light. However, the diffraction spectra components are transmitted through the diffraction grating at an angle that is offset from the incident optical path. In either embodiment, imaging lens means 18 is optically positioned out of optical communication with the zero order components of the diffraction pattern received from the regular periodic thermoplastic deformation pattern. Additionally, although not shown herein, an opaque apertured mask may be positioned in preceding relationship with respect to imaging lens means 18 to further impede the propagation therethrough of the zero order component. Thus, no less than a first order component of the diffraction pattern passes through the imaging lens means.

Imaging lens means 18 may comprise a conventional thin lens having a focal plane P—P and a focal point in the focal plane represented by reference numeral $P_1$. The light propagating to and through the imaging lens means 18 is focused onto the focal plane P—P thereof and thence projected from said focal plane to the image receiving surface S—S. As will be described hereinbelow, the optical components noted hereinabove comprise a conventional Suzuki projector.

Optical filter means 30 is adapted to receive the zero order diffraction component from the regular periodic thermoplastic deformation pattern and to derive therefrom a spherical wave having an effective point source disposed in the focal plane P—P at point $P_2$. Although the point source $P_2$ need not necessarily be derived from the zero order diffraction component, such point source must be properly phased with the source of coherent light 12 and must itself be coherent. However, to minimize the effects attributed to optical misalignments, as will be noted hereinbelow, it is preferable to derive the aforementioned point source from the zero order diffraction component. Accordingly, optical filter means 30 comprises lens means 20, 22 and 24 in cooperation with plane mirror means 26 and 28. Lens means 20 and 22 cooperate to transform the convergent beam provided by collimating lens means 14, 16 into a substantially parallel beam of light. The relative positioning of lens means 20 and 22 with respect to imaging lens means 18 as well as the opaque apertured masks that may be provided are adapted to yield effective optical separation between the zero order component of the diffraction pattern from the remaining order components thereof. The illustrated optical filter means 30 is further adapted to remove all modulation components derived from the regular periodic thermoplastic deformation pattern from the zero order diffraction components.

Plane mirror means 26 is adapted to intercept the filtered zero order diffraction component propagated thereto by lens means 20 and 22 and to reflect said zero order diffraction component toward plane mirror means 28. Lens means 24, which may act as an imaging lens similar to aforedescribed imaging lens means 18, is interposed between plane mirror means 26 and 28 and is provided with a focal point $P_2$ disposed in the focal plane P—P and offset thereat from focal point $P_1$. Consequently, lens means 24 serves to focus the filtered zero order component at point $P_2$ to produce a point source of coherent light at said point $P_2$. Plane mirror means 28 is positioned at focal point $P_2$ to intercept the zero order component focused thereat and is angularly disposed to reflect the focused zero order component toward display surface S—S. As is apparent from the geometry depicted in FIG. 1, the focal points $P_1$ and $P_2$ must be displaced an equal distance from the surface S—S; however, so long as this relationship is observed the placement of plane mirror means 28 is arbitrary and would ordinarily be located behind the focal point $P_2$. Consequently, overlap between the first order component and the zero order component occurs at image receiving surface S—S.

The regular periodic surface deformation pattern 10 may take the form, as aforesaid, of a frost pattern of image information recorded on conventional thermoplastic media. For example, the thermoplastic medium may comprise an insulating thermoplastic layer coated over a photoconductive substrate such as that described in the aforenoted U.S. Pat. No. 3,436,216. Image information may be recorded on the thermoplastic layer by projecting modulated input radiation thereto through a spatial grating such as a screen or grid having a sinusoidal transmission characteristic whose frequency corresponds to the quasi-resonance frequency of the thermoplastic layer. Such imaging technique to produce a frost deformation pattern is known as the screened thermoplastic imaging process. Alternatively, a suitable thermoplastic structure may be formed with a periodic physical profile at the interface between the thermoplastic layer and the photoconductive layer so that upon imaging and development the thermoplastic layer is forced to deform in a regular periodic manner. Such thermoplastic structure and the method for using same to form organized frost deformation patterns are clearly disclosed in aforenoted U.S. Pat. No. 3,698,893 and in aforenoted U.S. Pat. No. 3,719,483. Although each of the aforementioned U.S. patents contemplate the formation of a frost deformation pattern by projecting image modulation information to the thermoplastic material, such frost pattern may be formed by other conventional selective electrostatic charging techniques.

In a preferred embodiment of thermoplastic recording apparatus usable with the present invention, the thermoplastic structure 10 may be disposed in endless drum configuration, an endless web, a suitable web supply, or the like. In any of these embodiments, the focused light beam projected to the thermoplastic structure by the source of coherent light 12 may be reflected from such structure, as illustrated in FIG. 1, or may be transmitted through such structure so as to be received by suitable optical apparatus disposed in light receiving relationship therewith. Nevertheless, it is recognized that the movement of the thermoplastic structure causes the frost deformation pattern disposed thereon to be translated through the elemental area defined by the impinging light beam. Thus, a continuous frost image may be satisfactorily scanned by the movement of successive portions thereof through the defined elemental scanning area. Such scanning technique is turned to account by the present invention for those applications requiring the transmission of a frost image to a remote location.

Mathematical Analysis of Surface Deformation Pattern Readout

The increase in the intensity of the light image of the frost deformation pattern as received by the image receiving surface S—S in accordance with the present invention may best be understood by a mathematical analysis of the phenomenon achieved by the embodiment of the invention schematically illustrated in FIG. 1 as evaluated in terms of the simplified model thereof depicted in FIG. 2 which shows the spatial relationship among pertinent elements in a portion of the transmission path in an electro-optic read-out system. Therefore, turning now to FIG. 2, a system of coordinations may be readily established from the simplified model illustrated therein. In such system of coordinates the surface deformation represented by the thermoplastic material 10 is in the plane $z=0$, the lens (assumed for simplicity to be a thin lens) in the plane $z=d_1$ and the photo-detecting surface of the vidicon in the plane $z=d_1+d_2$. The coordinates in the $z=0$, and $z=d_1+d_2$ planes respectively may be denoted by $(\xi, \eta)$, $(u, v)$ and $(x, y)$.

In this system of coordinates the front surface of the periodic surface deformation pattern represented by the thermoplastic material 10 is represented by:

$$a(\xi,\eta)\cos(\Omega\xi); \qquad (1)$$

where $a$ equals the amplitude, and $\Omega$ equals the radian frequency of the periodic pattern.

Recalling the description of the apparatus set forth in conjunction with FIG. 1, it will be appreciated that the surface deformation represented by the thermoplastic material 10 is illuminated by a coherent, collimated beam of light of wavelength $\lambda$ in such manner that the first diffracted order propagates in the $z$ direction. For simplicity, and without loss of generality it may be here assumed that the beam is reflected from the front surface of the thermoplastic material and that the lens and surface deformation are of infinite lateral extent. Relying upon the identity $$\exp\left\{jka(\xi,\eta)\cos(\Omega\xi)\right\} = \sum_{n=-\infty}^{\infty} j^n J_n[(ka(\xi,\epsilon))] \exp[jn\Omega\xi], \qquad (2)$$

where $k=2\pi/\lambda$ and $J_n$ denotes the $n$th order Bessel function; it is apparent that the complex amplitude of the first diffracted order is, in the $z=0$ plane, proportional to $J_1[2cka(\xi, \eta)]$, where $0<c<1$ is a proportionality constant which depends on the incidence angle of the illuminating beam. In many practical situations, the argument of the Bessel function $J_1$ may be validly treated as small, so that the expression may be reduced as follows:

$$J_1[2cka(\xi,\eta)] \approx cka(\xi,\eta). \qquad (3)$$

If the optical system is so designed that the lens images only the first order component of the beam onto the vidicon surface, as is the case in Suzuki projection systems, the complex amplitude of the image may be denoted by $U(x,y)$ while the focal length of the lens is denoted by $f$. Then, by using the Fresnel approximation of the complex amplitude of the image may be represented by:

$$U(x,y) \approx \iota_2 \iiiint a(\xi,\eta) \exp\left\{\frac{jk}{2d_1}[(u-\xi)^2+(v-\eta)^2] - \frac{jk}{2f}(U^2+v^2) + \frac{jk}{2d_2}[(x-u)^2+(y-v)^2]\right\} d\xi\, dy\, du\, dv. \quad (4)$$

By using the lens equation $$\frac{1}{d_1} + \frac{1}{d_2} = \frac{1}{f}, \quad (5)$$

and solving the integral, it is found that:

$$U(x,y) = jKkca(x,y)\exp\left\{j\frac{k(x^2+y^2)}{2L}\right\}; \quad (6)$$

where k is a proportionality constant and $L=d_2-f$. Thus, the complex amplitude of an image formed at the vidicon surface when only the portion of FIG. 1 associated with the first order component represented by beam 17 is considered is represented by equation 6 and it will be appreciated by those of ordinary skill in the art that when the convergent beam 15 of coherent light formed by collimating lens means 14,16 from the beam 13 of coherent light eminating from source 12 impinges upon the frost deformation pattern disposed on thermoplastic structure 10, this impinging beam 15 is modulated by the information recorded as a surface deformation and the first order component of such modulated beam, as represented by beam 17 is imaged onto the surface of the vidicon 32. It will be further appreciated by those of ordinary skill in the art that as electro-optic systems employing transmission techniques are also contemplated by the instant invention, equation 6 may also be viewed as representing the complex amplitude of an image associated solely with the first order component obtained through such transmission techniques.

The image formed at the surface of the vidicon in response to the imposition of only a first order component thereon as has been heretofore discussed, will exhibit an irradiance $I_s$, as well known to those of ordinary skill in the art, equal to the square of the complex amplitude $|U(x,y)|^2$ thereof, where the subscripts associated with the irradiance term indicates the irradiance of the so called Suzuki image. Thus it will be appreciated that:

$$I_s = |U(x,y)|^2 = \left|jKkca(x,y)\exp\left\{j\frac{k(x^2+y^2)}{2L}\right\}\right|^2; \quad (7)$$

and hence it is readily observable that the intensity or irradiance of a Suzuki image projected on a surface is dependent upon the square of the amplitude ($a$) of the periodic deformation pattern.

Although an image irradiance which varies as the square of an amplitude may be a distinct advantage in cases where the magnitudes of such amplitudes exceed one, this is clearly not the case when the magnitudes of such amplitudes are small as clearly obtains when the surface perturbations of a frost image or the like represent the magnitude of the amplitude in question. Thus when the Suzuki image irradiance $I_s$, as represented by equation (7), is considered in light of the amplitude of the surface perturbations of a periodic deformation pattern, it will be appreciated that a Suzuki projection system suffers from the significant disadvantage that it depends upon the square of the amplitude of the periodic deformation pattern. It has been found in practical implementations of the Suzuki image projector that resolution of the projected image is impaired and the illuminance thereof appears undesirably low for surface deformation patterns exhibiting low amplitude perturbations. Furthermore, those applications wherein the projected light image is to be converted to electrical representations, the transducing of electrical signals is accomplished with a loss of integrity resulting in a loss of information contained in the original image because the rather low intensity of the input radiation which results from images of this type exhibits the use of the transducer in its optimum range. Thus, the electrical manifestation of the projected light image is not truly representative of the recorded frost deformation pattern derived from original image information. In addition, it may also be noted that inexpensive vidicons and other electro-optic transducers are frequently non-linear and small image irradiance generally precludes operation in a region of optimum response and sensitivity.

In accordance with the teachings of the present invention, the inherent draw backs of a Suzuki imaging system and the irradiance of the resulting image formed are overcome to thereby increase the irradiance of an image projected from a surface deformation pattern such as a frost deformation pattern in such manner that the irradiance varies in a linear manner with the amplitude of the surface purturbations which is preferable for magnitudes smaller than one, as aforesaid. More particularly, it has been discovered that the addition of a background or offset reference light source of coherent light will establish an intensity interference pattern at image receiving surface S—S, which interference pattern admits of a desirable intensity range. Furthermore, what is tantamount to image plane mixing with coherent radiation and hence image plane hetrodyning is achieved because as the two beams mixed are coherent at every point they can establish a periodic interference pattern which can be readily demodulated. The reference light source is preferably a point light source disposed at point $P_2$ in focal plane P—P. As schematically depicted in FIG. 1, point $P_2$ is offset from point $P_1$. Preferably, the point source at point $P_2$ propagates a coherent light beam 27 to image receiving surface S—S, which coherent light beam is derived from a spherical wave light source that is in phase with light beam 19. Although a suitable independent light source may be provided at point $P_2$, it is preferable to derive the zero order diffraction spectra reflected from the frost deformation pattern disposed on thermoplastic structure 10 and to utilize such derived zero order component as the point light source. In this manner, the effect of slight shifts in the longitudinal position of the thermoplastic structure 10 with respect to the optic axis may be reduced for the practical embodiment wherein the thermoplastic structure is disposed in drum or endless web configuration. Optical filter means 30 serves to focus the optically separated zero order component at point $P_2$ to thus utilize the zero order component as a point light source. Light beam 21 is collimated to light beam 23 by lens means 20,22, and light beam 23 is reflected by plane mirror means 26 to lens means 24. As noted hereinabove, lens means 24 admits of a focal plane that intersects the focal plane P—P. More particularly, the optical axis of lens means 24 intersects focal plane P—P at point $P_2$. Consequently, the zero order component received from the regular periodic thermoplastic deformation pattern is focused at point $P_2$. The focused zero order component in combination with plane mirror means 28 serves as a suitable point source of coherent light that is accurately phased with respect to the received first order component. The focused zero order component is reflected to image receiving surface S—S as light beam 27 by the angularly disposed plane mirror means 28. When the light beams 19 and 27 mix at the image receiving surface S—S an image having a modulated sinusoidal irradiance function is formed as a result of the spatial frequency of the constructively interfering fringes. The nature of the interference pattern formed as well as the irradiance of the resulting image may best be appreciated by a further analysis of the simplified model illustrated in FIG. 2.

According to the teachings of the present invention, the zero diffracted order of the readout beam is collected by a separate lens system, spatially filtered to remove amplitude variations, and focused at the point P in FIG. 2 corresponding to $P_2$ in FIG. 1; point P having the coordinates $z=d_1+f, x=0, y=b$. From point P, the zero diffracted order diverges towards the vidicon surface. At the vidicon surface (at $z=d_1+d_2$) the complex amplitude of the resulting image portion is:

$$K_1 \exp\left\{ j\ \frac{k(x^2+(y-b)^2)}{2L} \right\}; \qquad (8)$$

where $K_1 \lesssim K$ is another proportionality constant. The total light irradiance of the image formed at the vidicon surface which may be denoted by I, is $$I(x,y)=K^2_1 \{1+[Cka(x_1,y_1)]^2 - 2Cka(x_1,y_1)\sin[2\pi\lambda (Fy_1-\psi(]\} \qquad (9)$$

where $$x_1 = -\frac{d_1 x}{d_2},\ y_1 = \frac{d_1 y}{d_2},\ F = \frac{d_2 b}{\lambda L d_1},\ \psi = \frac{b^2}{2\lambda L}\ \text{and}\ C = \frac{Kc}{K_1}.$$

Since in this expression, the squared term involving amplitude within the brackets may be treated as small due to the small values of amplitude involved, it will be appreciated that the irradiance of the resulting image projected onto the surface of the vidicon varies in a linear manner with respect to amplitude. Furthermore, as the last term within the brackets is sinusoidally modulated, it can be isolated by electronic techniques, to be described hereinafter, provided that the spatial frequency F is large enough compared to the spatial frequencies contained in $a(x_1, y_1)$.

Although the zero order diffraction spectra contains a relatively large D.C. component that is analogous to a large background light component which might be expected to cause very low contrast of the image intensity of the light pattern received at the image receiving surface S—S, it will be appreciated from equation (9) above that the addition of an offset reference light source of coherent radiation according to the teachings of the instant invention results in a constructive, periodic interference pattern in the image plane which is coherent at every point. The zero order diffraction spectra may be readily separated in the manner illustrated in the exemplary embodiment as it is known that in an embodiment employing the reflection of deflected light the zero order component of the diffraction spectra is propagated at an angle of reflection that is equal to the angle of incidence. As schematically represented in FIG. 1, light beam 21 depicts the zero order diffraction spectra and is seen to be propagated at an angle of reflection that is equal to the angle of incidence of light beam 15. Similarly, it is known that the angle of reflection of first order diffraction spectra as well as higher order diffraction spectra (i.e., minus 1 plus 2... ) is offset from the angle of incidence of projected coherent light. As schematically represented in FIG. 1, light beam 17 is assumed to include at least the first order diffraction spectra and is angularly displaced from incident light beam 15 by an angle $\theta$. Alternatively, in a transmitted light embodiment wherein image modulated light is transmitted through the thermoplastic structure 10 in contradistinction to the reflection of such image modulated light, the axis of transmission of the zero order diffraction spectra coincides with that of the incident light whereas the axis of transmission of at least the first order diffraction spectra is angularly displaced with respect to the incident light axis. In either embodiment it should be readily appreciated that the zero order diffraction spectra may be optically separated from the first order diffraction spectra by the particular optical alignment of coherent light source 12 and image receiving surface S—S and by the additional use of opaque apertured masks and the like. As illustrated in FIG. 1, imaging lens means 18 is optically located to receive at least the first order component of the diffraction spectra and to image said at least first order component to image the receiving surface S—S. The optical axis of the imaging lens means is thus seen to coincide with the axis of transmission of light beam 17. Hence, imaging lens means 18 is optically positioned out of optical communication with the zero order component included in light beam 21. Although not shown herein, the optical separation between light beams 17 and 21, and thus between the first order diffraction spectra and the zero order diffraction spectra, may be enhanced by the addition of an opaque apertured mask located in front of the imaging lens means.

The irradiance of the image defined by equation (9) and formed by the optical technique schematically represented in FIG. 1 is seen to be linearly dependent upon the amplitude of the periodic deformation pattern formed on the thermoplastic structure 10. The dynamic irradiance range is here nearly equal to the dynamic deformation range of the frost deformation pattern. Consequently, contrast of the image at the image receiving surface S—S is substantially equal to the contrast of the original light pattern that is recorded on the thermoplastic structure 10 as a regular periodic thermoplastic deformation pattern. Therefore, there is little loss in integrity in the resolution of the image at the image receiving surface, and only a small degree of the information contained in the original light pattern is lost. In addition, the input radiation may be tuned to the input characteristics of a transducer.

Transducing the Received Image

The aforesaid image enhancing technique of the present invention finds ready application for the transmission of a frost deformation pattern to a remote location. As the original information recorded on the thermoplastic structure 10 appears as modulated light on the image receiving surface S—S, it is appreciated that an electrical representation of such modulated light may be facilely generated if the image receiving surface comprises the surface of a photoelectric transducer. In general, a photoelectric transducer is adapted to generate a current or voltage proportional to the intensity of a light image impinging thereon. Thus, an increase in the intensity of the light image of recorded information disposed in frost deformation configuration is seen to have substantial practical significance in the transducing of such image to electrical manifestations and the subsequent transmission of such electrical manifestations to a remote location. Futhermore, an increase in the image intensity and a linear dependence thereof upon the amplitude of the periodic deformation pattern at the thermoplastic structure 10 permits accurate resolution of the image, a linear transducing thereof to electrical signals, the utilization of the photoelectric transducer in its region of optimum response and sensitivity, an overall modulation transfer function having a rising function of exposure related target scene spatial frequencies and operation of the photoelectric transducer at substantially less power than heretofore required.

If image receiving surface S—S is disposed as the surface of photoelectric transducer 32, it may be appreciated that such photoelectric transducer may be any conventional commercially available device capable of generating electrical manifestations related to impinging image light intensity. Preferably, for those applications wherein a regular periodic thermoplastic deformation pattern is disposed on thermoplastic structure 10 such that successive portions of the pattern are scanned by the optical technique of the present invention, photoelectric transducer 32 may be a conventional electron beam image pickup tube such as an iconoscope, image disector, image orthicon, vidicon and the like. The foregoing photoelectric transducers are merely exemplary and, for the purpose of the present discussion, photoelectric transducer 32 may be assumed to comprise a commercially available vidicon such as an RCA C74137A return beam vidicon, manufactured by RCA Corporation. Nevertheless, it should be clearly understood that the present invention is not intended to be limited to applications involving only vidicons or to those applications employing the exemplary photoelectric transducers noted hereinabove.

The optical irradiance $I(x,y)$ is translated by a vidicon into a temporal signal described by the equation:

$$I(t) = A \{1 + m^2(t) - m(t) \sin(\omega_o t - \psi)\}. \qquad (10)$$

The Fourier transform of $m(t)$ may be denoted by $M(\ )$ while $\omega_m$ may be relied upon to denote the highest angular frequency of $M(\omega)$. Depending upon such engineering considerations as the resolution of the vidicon, $\omega_o$ the interference or carrier frequency, may be made sufficiently large so that when $I(t)$ is passed through a high pass filter, adapted to stop frequencies below $\omega_o - \omega_m$, the d.c. term and as large a portion of $m^2(t)$ as is feasible are stopped. Furthermore, because $m^2(t)$ is small compared to $m(t)$, it may here be assumed for simplicity that all of the $m^2(t)$ term is attenuated by the high pass filter so that the output signal thereof is represented by the equation:

$$I(t) = -Am(t) \sin(\omega_o t - \psi) \qquad (11)$$

where $\psi$ is a known function of time. The image information is contained in the $m(t)$ term of equation (11) and may be recovered by several well-known detection techniques.

Demodulation of the Image Translated Current

The modulated image information represented by the current $I(t)$ defined by equation (11) may be transmitted directly by conventional transmission systems to a remote location. Alternatively, the filtered image information $m(t)$ can be recovered from the output current generated by photoelectric transducer 32 by conventional demodulation techniques, and the recovered image information represented by the demodulated signal may then be transmitted to a remote location by conventional communication techniques or may be otherwise utilized as desired. One approach to demodulation that may be employed to recover the image information signal $m(t)$ is the so-called full wave linear rectification technique and exemplary apparatus for detection according to this technique is illustrated in FIG. 3. The full wave linear rectification detection apparatus depicted in FIG. 3 comprises a full wave linear rectifier 33 and a low pass filter means 36. The full wave linear rectifier 33 may comprise, for example, conventional rectifier diodes configured for full wave rectification, as is understood. In linear rectification a graphical representation of the current-voltage characteristic exhibits a linear relationship that passes through the origin. The output of the full wave linear rectifier 33 is coupled to low pass filter means 36. The low pass filter means 36 may take the form of conventional low pass filter apparatus and may here be considered to be designed to exhibit a stop or cut off frequency which may typically reside at $2\omega_o - \omega_m$ and otherwise exhibit the frequency characters indicated in FIG. 3 although the stop frequency selected could reside anywhere between $\omega_m$ and $(2\omega_o - \omega_m)$ because as will be appreciated by those of ordinary skill in the art this is an empty area in the resulting waveform as represented by a fourier transform.

In operation, the full wave linear rectifier 33 operates upon the filtered, modulated signal supplied thereto by photoelectric transducer 32 so as to produce a linearly rectified output signal that may be expressed in a fourier series. The first term of such fourier series is a d.c. term which is linearly proportional to the informational component $m(t)$, and the second term of such fourier series represents the fundamental informational component $m(t)$ as modulated on a carrier admitting of twice the interference frequency $2\omega_o$.

The low pass filter means 36 exhibits a frequency dependent attenuation characteristic whereby frequency components that exceed the maximum frequency included in the informational component $m(t)$ are substantially attentuated. More particularly, low pass filter means 36 is characterized by a stop band or cutoff frequency, that exceeds the maximum frequency $\omega_m$ expected in the informational component $m(t)$ but is less than the minimum frequency included in the spectrum of information centered on the frequency $2\omega_o$. Thus, the stop band or cutoff frequency exhibited by the low pass filter means is less than the frequency $2\omega_o-\omega_m$. Consequently, only the unmodulated informational component $m(t)$ supplied by full wave linear rectifier 33 is transmitted by the low pass filter means 36 to recover the informational component that may be expressed generally as $(2G_o/\pi)CAm(t)$, where $G_o$ represents the forward conductance of the rectifying element included in the full wave linear rectifier 33 and $C$ represents the passband attentuation of low pass filter means 36. The recovered informational component $m(t)$ which is an accurate representation of the original light image recorded as a regular periodic thermoplastic deformation pattern on thermoplastic structure 10 may be communicated to a remote location by conventional communication techniques or may be locally utilized for any desired purpose. It should be recognized that the accuracy with which the apparatus depicted in FIG. 3 recovers the electrical representation of the original light image recorded on the thermoplastic structure 10 is dependent, in part, upon the linear relationship between the dynamic intensity range of the light image received by photoelectric transducer 32 and the amplitude of the periodic deformation pattern; the relative increase in intensity of the light image received by the photoelectric transducer 32 in the absence of an accompanying loss in contrast of the received image; and the operation of the photoelectric transducer in its optimum range of operating characteristics.

The full wave rectification approach to detection or demodulation as described in conjunction with FIG. 3 is highly advantageous due to its simplicity and is preferred whenever system parameters are such that good image retrieval obtains. In many practical applications, however, the vidicon frequency response produces two unsymmetrical sidebands in the frequency spectrum of $I(t)$. In addition, $I(t)$ may be of the form:

$$I(t) = -Am(t)\sin(\omega_o t - \psi) + Bn(t)\cos(\omega_o t - \psi) \quad (12)$$

where the second term contains unwanted information, and $\psi$ is a known function of time. In these cases, a synchronous mode of detection, even though more complex, may be advantageous. Exemplary apparatus for carrying out synchronous detection on the filtered output signal presented by the vidicon 32 is generally illustrated by the block diagram of FIG. 4.

The synchronous demodulator shown in FIG. 4 comprises multiplier means 42, reference signal generator 44 and low pass filter means 46. Multiplier means 42 is coupled to the filtered output of photoelectric transducer 32 and is adapted to multiply the transducer output current $I(t)$ as given by equation 12 by a reference signal supplied thereto by reference signal generating means 44. Multiplier means 42 may thus comprise a conventional mixer for separating the image information $m(t)$ from the sinusoidal interference frequency. Reference signal generating means 44, coupled to multiplier means 42, may comprise a conventional highly-controlled sinusoidal oscillator capable of generating a reference signal admitting of a frequency that is equal to the interference frequency exhibited by the modulated signal generated by photoelectric transducer 32 which in this case may be given by the expression:

$$\sin(\omega_o t - \psi_o) \quad (13)$$

where $\psi_o$ may represent a function of time related to $\psi$. As will be appreciated by those of ordinary skill in the art, when two optical signals are caused to interfere under practical conditions, the same interference frequency $\omega_o$ may not be obtained all across the vidicon but instead a shift $\psi$ may be introduced by the vidicon. Therefore, a similar shift $\psi_o$ may be introduced by the reference signal generating means 44 to enhance image recovery and it will be appreciated by those of ordinary skill in the art that $\psi_o$ should approach $\psi$ as closely as possible. One of ordinary skill in the art will recognize that if the locally generated reference carrier signal produced by reference signal generating means 44 is closely regulated in frequency and phase to the interference carrier signal generated by the photoelectric transducer, multiplier means 42 serves to produce an output signal corresponding to the modulated input carrier multiplied by the locally derived reference signal.

The output of the multiplier 42 is applied to the input of the low pass filter means 46. The low pass filter means 46 may take any of the well-known forms of this conventional class of device and may exhibit a frequency dependent attentuation characteristic, as indicated in FIG. 4 which is the same as that described for the low pass filter means 36 shown in FIG. 3. Alternatively, the low pass filter means 46 may be selected to have its stop or cutoff frequency centered at $\omega_m$, as defined above, so that a slightly sharper cutoff for frequencies above $\omega_m$ is obtained. The low pass filter means 46, as will be appreciated by those of ordinary skill in the art, acts to filter the resultant signal produced by the multiplier means 42 to remove frequency components therein that exceed the maximum frequency $\omega_m$ included in the information component $m(t)$ representing the original image information recorded on the thermoplastic structure 10. As the information signals included in the information spectrum above $\omega_m$ are effectively attenuated by the low pass filter means 46, the resultant output signal passed by the low pass filter means 46 may be represented by the expression:

$$-C\left[+\frac{A}{2}m(t)\cos(\psi-\psi_o)+\frac{Bn}{2}(t)\sin(\psi-\psi_o)\right] \quad (14)$$

where $C$ is the passband attenuation intrinsic to the low pass filter means 46. As will be appreciated by those of ordinary skill in the art, if $\psi-\psi_o$ is made to closely approach zero, as aforesaid, equation 14 reduces to $$\frac{-CA_m}{2}(t). \quad (15)$$

Thus, when $\psi-\psi_o$ is made to closely approach zero the unwanted information represented by the second term of equations 12 and 14 is removed and a highly accurate information signal is recovered. Accuracy of the recovered signal to closely represent the original image information is dependent upon the fact that the dynamic intensity range of the light image received at image receiving surface S—S of the photoelectric transducer 32 is linearly related to the dynamic deformation range of the periodic deformation pattern at the thermoplastic structure and that the intensity of the light image projected to the photoelectric transducer surface is sufficiently large to permit operation of the photoelectric transducer over its optimum operating region. In addition, it is necessary that reference signal generating means 44 be locked in both frequency and phase with the carrier component. A nonrepresentative output signal is recovered from low pass filter means 46 in the event of a relative phase shift between the carrier component generated by the photoelectric transducer and the local carrier signal produced by reference signal generating means 44. A relative displacement in frequencies between the produced carrier component and the locally generated carrier signal results in an output informational component $m(t)$ modulated at the difference frequencies. Conventional control techniques, well known to those of ordinary skill in the art may be employed to effect precise regulation over the frequency and phase of the locally generated carrier signal. However, the physical implementation of the electro-optic readout of themoplastic deformation images in accordance with the present invention admits of various unknown parameters that complicate the precise prediction of the carrier component produced by the photoelectric transducer 32. For example, the constancy of the time duration of the photoelectric transducer scan; the linearity of the photoelectric transducer scan, the positioning of the regular periodic thermoplastic deformation pattern in precisely the same plane on the optic axis; the homogeneity of the image receiving surface S—S of the photoelectric transducer and the inherent aberrations of imaging lens means 18 all contribute to the difficulty in accurately controlling and predicting the carrier component. Thus, where available, the full wave linear rectifying mode of detection represents a highly simplified mode of detection and is to be preferred.

As noted hereinabove, the surface deformation pattern in the form of the regular periodic thermoplastic deformation pattern recorded on thermoplastic structure 10 may be scanned by the coherent light beam 15 of FIG. 1 as the thermoplastic structure is moved through the elemental scanning area. Thus, if photoelectric transducer 32 comprises a vidicon or the like, the continuous deformation pattern may be read out and converted to an electrical manifestation thereof by the synchronized movement of the thermoplastic structure 10 and the scanning beam of the vidicon. It has been found that when a vidicon is employed to generate an electrical manifestation of a received light image, residual signals related to the original light image remain for a number of scanning frames subsequent to the original exposure. That is, a "ghosting" of the original image remains on the imaging surface of the vidicon for a finite duration of time until the photoconductive material thereof completely recovers for a subsequent image exposure. This finite interval of time is equal to a number of scanning frames, i.e., the time required for a number of complete scans of the vidicon image surface. It has been found that effective use of the vidicon requires, for example, five complete scans of the imaging surface thereof, the first scan for generating electrical manifestations of the light image projected thereto and the next four scans for preparing the vidicon for a subsequent exposure. It is recalled that the source of coherent light 12 may be a pulsed light source, such as a pulsed laser source, whereby the pulse of coherent light emitted thereby may immediately precede the first frame scan and no coherent light is emitted thereby during the next four frame scans. Should such technique be employed in the electro-optic readout of a thermoplastic deformation pattern in accordance with the present invention, the total time required to read out a complete recorded image would be undesirably high. A typical numerical example thereof requires 1.32 seconds for each frame scan and 0.02 seconds for each pulsed exposure time. In one embodiment of a photoelectric readout of a thermoplastic deformation pattern, a complete recorded pattern occupies the equivalent of 81 frames on the thermoplastic structure 10. It, therefore, requires:

$$[0.02 + 1.32 + 4(1.32)]81/60 = 8.9 \text{ minutes}$$

to read out a single complete thermoplastic image.

The readout of recorded information and conversion thereof to electrical manifestations may be increased by increasing the scan rate during each vidicon preparation interval. Such increase of scan rate may be obtained by defocusing the electron beam during the preparation interval; increasing the beam current during the preparation interval; and decreasing the scan resolution during the preparation interval. Now, it has been discovered that a reduction in the requisite time to read out a thermoplastic deformation pattern by a vidicon may be effected by exposing the vidicon to a brief pulse of intense light prior to the fast overscan, i.e., prior to the increased scanning rate during the preparation interval. Preferably, the limited duration light pulse, hereinafter the supplemental exposure, is much larger than the maximum intensity included in the modulated light information projected to the vidicon from the regular periodic thermoplastic deformation pattern. That is, the intensity of the supplemental exposure is greater than the information image intensity represented by equation (9) hereinabove. In an exemplary implementation of the foregoing, the fast overscan is effected in approximately one third the time of the data readout scan. Similarly, the supplemental exposure is effected for a pulse interval of 0.01 seconds. Thus, the total time required to convert 81 frames of information recorded on thermoplastic structure 10 to electrical manifestations thereof is:

$$[0.02 + 1.32 + 0.01 + 1.32/3]81/60 = 2.44 \text{ minutes.}$$

Since information is read out during the slow scan interval of 1.32 seconds, it is seen that a substantial increase in the scanning rate required for the electro-optic readout of thermoplastic deformation patterns is achieved if the photoconducting surface of the vidicon is flooded with relatively high intensity light for a brief duration of 0.01 seconds, for example, intermittent each data readout scan interval to thereby erase the residual signals of the immediately preceding scanned frame of the thermoplastic deformation pattern. It is further seen that each scanned frame of recorded information is spatially coextensive with the elemental area defined by coherent light beam 15 impinging upon the surface of the thermoplastic structure 10 illustrated in FIG. 1. Conventional synchronizing control means may be readily employed to synchronize the pulsing of the source of coherent light 12, the movement of the thermoplastic structure 10 and the electron beam scanning of the vidicon 32.

While the invention has been particularly shown and described with reference to an exemplary embodiment thereof, it will be obvious to those skilled in the art that various changes and modifications in form and details may be made without departing from the spirit and scope of the invention. Thus, although a vidicon is described for preferable use with the instant invention to translate a light image of a recorded thermoplastic deformation pattern into electrical manifestations thereof, it is appreciated that other conventional photoelectric transducers may be employed. Additionally, the present invention finds ready application for the electro-optic readout of any surface deformation patterns and particularly frost deformation patterns that may be recorded on thermoplastic media by imaging through a spatial grating, or screen, or by providing the thermoplastic structure 10 with an interface between the thermoplastic layer and the photoconductive layer having a physical periodic profile. Other analogous techniques may be likewise employed to obtain an organized frost deformation pattern that is everywhere periodic. Furthermore, although two exemplary demodulation techniques have been shown and described hereinabove, other conventional detecting methods, and the apparatus therefor, may be employed to recover the informational component of the electrical representation generated by the photoelectric transducer 32 such that an accurate representation of the original image information may be obtained. Furthermore, the light reflective embodiment illustrated in FIG. 1 is merely exemplary. The reflection of light beam 17 to image receiving surface S—S and the superposition at the image receiving surface of the zero order component included in reflected light beam 21 may be replaced by the transmission of the first order component through the thermoplastic structure 10 and the similar transmission therethrough of the zero order component. Suitable optical filter means may be provided to receive the transmitted first order and zero order components and to effectively superpose said components at an image receiving surface to thereby mix the components resulting in an interference pattern that appears as image modulated sinusoidal interference fringes.

Therefore, it is intended that the appended claims be interpreted as including the foregoing as well as all other obvious modifications and changes in form, in details and in application.

What is claimed is:

1. A method of projecting an image disposed as a regular periodic surface deformation pattern comprising the steps of:
   projecting a first coherent light beam to said deformation pattern;
   imaging a first order component of the diffraction pattern received from said deformation pattern onto an image receiving surface to thereby form a light image on said image receiving surface having an intensity that varies as a function of the square of the amplitude of the periodic deformation pattern; and
   superposing on said image receiving surface a second coherent light beam to form an interference pattern having an intensity that varies as a linear function of the amplitude of the periodic deformation pattern and that appears as image modulated sinusoidal interference fringes.

2. The method of claim 1 wherein said step of imaging a first order component of the diffraction pattern comprises the steps of receiving said first order component reflected from said deformation pattern; focusing said first order component onto a focal plane; and transmitting said first order component from said focal plane to said image receiving surface along a first optical path.

3. The method of claim 2 wherein said step of superposing a second coherent light beam comprises the steps of focusing the zero order component of the diffraction pattern reflected from said deformation pattern onto said focal plane at a point offset from the point at which said first order component is focused and transmitting said zero order component from said offset point to said image receiving surface along a second optical path.

4. The method of claim 3 further comprising the step of optically filtering the diffraction pattern received from said deformation pattern to prevent the transmission of said zero order component along said first optical path.

5. Apparatus for increasing the intensity of a projected image of a periodic surface deformation pattern, comprising:
   means for projecting a beam of coherent light to said deformation pattern;
   imaging lens means for imaging a first order component of the diffraction pattern received from said deformation pattern onto an image receiving surface, said imaging lens means being optically positioned out of optical communication with the zero order component of said diffraction pattern; and
   optical filter means disposed to receive said zero order component and to transmit said zero order component to said image receiving surface whereat said zero order component mixes with said first order component to form an interference pattern comprised of image modulated sinusoidal interference fringes having an intensity that varies as a linear function of the amplitude of the deformation pattern.

6. The apparatus of claim 5 wherein said optical filter means includes lens means having a focal point disposed in the focal plane of said imaging lens means and offset from the focal point of said imaging lens means.

7. The apparatus of claim 6 wherein said means for projecting a beam of coherent light comprises a laser light source and laser beam expanding means optically interposed between said laser light source and said deformation pattern.

8. A method of transmitting an image disposed as a regular periodic surface deformation pattern comprising the steps of:
   scanning successive portions of said deformation pattern with a coherent light beam;
   imaging at least a first order component of the diffraction pattern received from each scanned portion of said deformation pattern onto a photoconductive surface of a vidicon image transducer by focusing said at least first order component onto a focal plane and projecting said at least first order component from said focal plane to said photoconductive surface;

focusing the zero order component of said diffraction pattern received from each scanned portion of said deformation pattern onto said focal plane at a point offset from the point at which said at least first order component is focused and projecting said zero order component from said offset point to said photoconductive surface whereat said at least first order component and said zero order component are mixed to form an interference pattern;

flooding said photoconductive surface with relatively high intensity light intermittent each scan interval to erase residual signals of an immediately preceding scanned portion of said deformation pattern;

demodulating the electrical representations generated by said vidicon image transducer in response to said mixed first order components and said zero order component, said electrical representations comprising an informational component related to each scanned portion of said deformation pattern modulated onto a carrier component related to the interference frequency, to thereby recover said informational component; and transmitting said informational component.

9. The method of claim 8 wherein said step of imaging at least a first order component comprises the steps of:

optically separating the zero order component of the diffraction pattern from the remaining order components thereof; and transmitting said at least first order component to said focal plane by a first optical path.

10. The method of claim 9 wherein said step of focusing said zero order component comprises transmitting said optically separated zero order component to said offset point by a second optical path.

11. A method of electrically transmitting information contained in a regular periodic surface deformation pattern comprising the steps of:

irradiating said regular periodic surface deformation pattern with a coherent light beam;

imaging a first order component of the diffraction pattern received from the irradiated surface deformation pattern onto the surface of a photoelectric transducer;

mixing said first order component with a further coherent light beam at said transducer surface to form an interference pattern thereat and to thereby generate an electrical representation thereof comprised of an electrical informational component related to said surface deformation pattern modulated onto an electrical carrier component related to the interference frequency;

demodulating said electrical representation to recover said electrical informational component; and transmitting said electrical information component.

12. The method of claim 11 wherein said step of demodulating said electrical representation comprises the steps of:

multiplying said electrical representation with a reference signal having a frequency equal to the frequency of said electrical carrier component; and filtering the resultant product signal to remove frequency components therein that exceed the maximum frequency included in said electrical informational component.

13. The method of claim 11 wherein said step of demodulating said electrical representation comprises the steps of:

full wave linearly rectifying said electrical representation; and filtering the resultant linearly rectified signal to remove frequency components therein that exceed the maximum frequency included in said electrical informational component.

14. The method of claim 11 wherein said step of imaging said first order component comprises the steps of:

optically separating the zero order component of the diffraction pattern from the remaining order components thereof;

focusing said at least a first order component onto a focal plane; and projecting said at least said first order component from said focal plane to said photoelectric transducer surface.

15. The method of claim 14 wherein said step of mixing said at least first order component with a further coherent light beam comprises the steps of:

recovering said separated zero order component;

focusing said zero order component onto said focal plane at a point offset from the point at which said at least first order component is focused; and projecting said zero order component from said offset point on said focal plane to said photoelectric transducer surface.

16. Apparatus for transmitting an image disposed as a regular periodic surface deformation pattern to a remote location, comprising:

means for projecting a beam of coherent light to said deformation pattern;

imaging means in optical communication with no less than a first order component of the diffraction pattern received from said deformation pattern for imaging said first order component onto the surface of a photoelectric transducer;

a source of coherent light for transmitting a further beam of coherent light to said photoelectric transducer surface whereat said further beam of coherent light mixes with said first order component to form an interference pattern comprised of image modulated sinusoidal interference fringes;

a photoelectric transducer having a surface upon which said interference pattern is formed for generating an electric signal representing said interference pattern, said signal comprised of an informational component related to said deformation pattern modulated onto a carrier component related to the spatial frequency of said interference fringes;

demodulation means coupled to said photoelectric transducer for demodulating said electric signal to recover said informational component; and means for transmitting said recovered informational component to said remote location.

17. The apparatus of claim 16 wherein said photoelectric transducer comprises a vidicon tube.

18. The apparatus of claim 16 wherein said demodulation means comprises a synchronous detector including:

multiplying means coupled to said photoelectric transducer for multiplying said electric signal with a reference carrier signal having a frequency equal to the frequency of said carrier component; and low pass filter means coupled to said multiplying means for attenuating signals having frequencies above a predetermined frequency, said predetermined frequency being greater than the maximum frequency included in said informational component.

19. The apparatus of claim 16 wherein said demodulation means comprises full wave linear rectifying means.

20. The apparatus of claim 16 wherein said means for projecting a beam of coherent light comprises a laser light source and laser beam expanding means optically interposed between said laser light source and said deformation pattern.

21. The apparatus of claim 20 wherein said laser light source comprises an ion pulsed laser system.

22. The apparatus of claim 20 wherein said laser light source comprises a neodymimum-doped laser system.

23. The apparatus of claim 16 wherein said imaging means comprises lens means interposed between said deformation pattern and said photoelectric transducer surface and having a focal plane intermediate said lens means and said photoelectric transducer surface.

24. The apparatus of claim 23 wherein said source of coherent light comprises an effective light source disposed in said focal plane at a point offset from the focal point of said lens means at which said first order component is focused.

25. The apparatus of claim 24 wherein said effective light source comprises optical filter means disposed to receive the zero order component of the diffraction pattern from said deformation pattern for focusing said zero order component on said offset point from which said zero order component is transmitted to said photoelectric transducer surface.

26. The apparatus of claim 25 wherein said lens means is optically positioned out of optical communication with said zero order component.

* * * * *